United States Patent [19]

Andre

[11] Patent Number: 4,585,925

[45] Date of Patent: Apr. 29, 1986

[54] SYSTEM TO CONTROL AND REGULATE HEAT APPLIED DURING THE HEATING PHASE OF A STEAM PRESSURE COOKING VESSEL

[75] Inventor: Wolfram K. Andre, Aichwald, Fed. Rep. of Germany

[73] Assignee: Kurt Wolf & Co. KG, Fed. Rep. of Germany

[21] Appl. No.: 673,197

[22] Filed: Nov. 19, 1984

[30] Foreign Application Priority Data

Nov. 24, 1983 [DE] Fed. Rep. of Germany ....... 3342416

[51] Int. Cl.⁴ .............................................. H05B 1/02
[52] U.S. Cl. .................................... 219/497; 219/442; 219/492; 340/589; 426/523; 99/330; 99/335; 99/328
[58] Field of Search ............... 219/490, 508, 494, 497, 219/492, 501, 499, 441, 442; 340/588, 589; 99/328, 332, 333, 335; 426/520, 523

[56] References Cited

U.S. PATENT DOCUMENTS

| 4,367,399 | 1/1983 | Anthony et al. ................ 219/497 |
| 4,379,964 | 4/1983 | Kanazawa et al. ............. 219/497 |
| 4,461,951 | 7/1984 | Luoma, II et al. .............. 219/497 |

*Primary Examiner*—M. H. Paschall
*Attorney, Agent, or Firm*—Thomas W. Speckman

[57] ABSTRACT

A system to control and regulate heat output during the heat-up phase of a pressure cooker heated by a heating element which can be turned on and off by means of a control circuit. The heat-up phase is adjusted, depending on the rate of temperature increase before it reaches the boiling temperature, and is controlled by a different program after the boiling temperature is reached, which determines rates of further temperature increases and also the temperature differentials between a preset cooking temperature and the current cooking temperature. Using this apparatus, the cooking temperature can be reached as quickly as possible, regardless of the characteristics of the heating phase, dependent upon the type and amount of cooking material in the pressure cooker. Energy utilization efficiency can be increased and the preset cooking temperature not exceeded.

15 Claims, 4 Drawing Figures

| ΔT/Δto [°C/sec] | hd1 [%] | s [sec] bei Δto |
|---|---|---|
| <1,5 | 100 | 24 |
| 2,0 | 87,5 | 21 |
| 2,5 | 75,5 | 18 |
| 3,0 | 62,5 | 15 |
| 3,5 | 50,0 | 12 |
| 4,0 | 37,5 | 9 |
| 4,5 | 25,0 | 6 |
| 5,0 | 12,5 | 3 |
| >5,0 | 0 | 0 |

Δto = 24 sec
Δtv = 2 min

| ΔT [°C] | 15 | 12 | 9 | 6 | 4,5 | 3 | 2,5 | 2 | 1,5 | 1 | 0,5 | 0 | - |
|---|---|---|---|---|---|---|---|---|---|---|---|---|---|
| <1,5 | 100 | 100 | 50 | 25 | 19 | 19 | 19 | 12,5 | 12,5 | 12,5 | 6 | 0 | 0 |
| 2,0 | 100 | 50 | 25 | 19 | 19 | 12,5 | 12,5 | 6 | 0 | 0 | 0 | | |
| 2,5 | 50 | 25 | 19 | 12,5 | 6 | 0 | 0 | 0 | | | | | |
| 3,0 | 25 | 19 | 6 | 0 | 0 | | | | | | | | |
| 3,5 | 19 | 12,5 | 0 | | | | | | | | | | |
| 4,0 | 12,5 | 6 | | | | | | | | | | | |
| 4,5 | 6 | 0 | | | | | | | | | | | |
| 5,0 | 0 | | | | | | | | | | | | |
| >5,0 | 0 | | | | | | | | | | | | |

Fig. 4

SYSTEM TO CONTROL AND REGULATE HEAT APPLIED DURING THE HEATING PHASE OF A STEAM PRESSURE COOKING VESSEL

BACKGROUND OF THE INVENTION

1. Field of the Invention

This invention relates to a system to control and regulate the heat applied during the heat-up phase of a steam pressure cooker which is heated by a heating element which may be turned on and off by means of a control circuit.

2. Description of the Prior Art

In known steam pressure cooking vessels, there is usually full heat applied during the heat-up phase of the system until it reaches boiling temperature, or shortly before, and only then a preset cooking temperature is established.

However, these known systems do not provide the optimal solution from an energy efficiency standpoint. Also, it is possible that shortly after the heat-up phase, the temperature in the steam pressure cooker may exceed the preset cooking temperature for a shorter or longer period of time before regulation is effected, due to the momentum of the heating system. These inconsistencies arise because the temperature and timing characteristics of heating systems can vary considerably, depending upon the contents of the steam pressure cooker. The rate of temperature increase during the heat-up phase depends, to a large extent, on the amount and type of cooking material in the steam pressure cooker. It is significant, whether there is only liquid in the pressure cooker, or whether the liquid provides a water bath, and is used to generate steam to cook solid foods which are arranged above the water bath. The type and amount of cooking materials affects the temperature-time curve characterizing the heat-up phase of the system.

SUMMARY OF THE INVENTION

One object of this invention is to provide a system of the type described above which controls and regulates the heat-up phase automatically, and depending on the type and amount of cooking materials in the pressure cooker, attains the preset cooking temperature as fast as possible and as energy-efficiently as possible, and regulates it without exceeding it.

This object is achieved according to the present invention as follows: during the heat-up phase, the time elapsed between reaching two specified temperatures, both lower than the boiling temperature, is measured; if a specified time span is exceeded, the control unit keeps the heating element switched on continuously until the boiling temperature is reached; but if the actual time elapsed is less than the specified time span, the actual temperature difference observed during a predetermined time interval is measured, the control unit, according to a first program, turns on the heating element for a certain time period during the subsequent predetermined time interval, the time period decreasing as the temperature difference increases; the temperature difference continues to be measured over the same predetermined time intervals after the boiling temperature is reached, and depending on the temperature difference which has been measured, the control unit, according to a second program, turns the heating unit on for a certain time period during the subsequent predetermined time interval, the time period decreasing as the temperature difference increases and as the temperature differential between the desired boiling temperature and the current actual temperature decreases.

Before the boiling temperature is reached, the slope of the temperature-time curve is determined. This indicates the type of cooking materials in the steam pressure cooker. If the rate of temperature increase is slow, full heating application may be maintained until the boiling temperature is reached, whereas if the rate of temperature increase is fast, heat application may be decreased, depending on the actual temperature difference observed during a predetermined time interval. When the boiling temperature is reached, heat application is decreased. Not only the temperature difference which was measured during the predetermined time interval, but also the temperature differential between the desired preset cooking temperature and the actual temperature is considered. Heat application is decreased, as smaller temperature differentials and larger temperature differences are observed, in order to maintain the cooking temperature continuously. In this system, the energy requirements are adjusted during the heat-up phase so that the cooking temperature is reached as quickly as possible, while heat application is automatically adjusted according to the type and amount of cooking materials. Furthermore, the desired preset cooking temperature is not exceeded.

A system having the following features has proven to be especially advantageous: a control unit has a semiconductor switch for turning the heating element on and off which can be controlled by a zero voltage switch with cycle control according to known methods, the duration of the cycle corresponding to the predetermined time interval to generate a uniform timing pulse used for calculating the temperature difference and for cyclic control of the control unit and of the heating unit.

According to one embodiment, control of the heat output during a rapid rise in temperature before reaching the boiling temperature, is effected so that until the boiling temperature is reached, the power on time of the heating element corresponds to the predetermined time interval if the actual measured temperature difference falls below a first specified temperature difference, whereas the power on time of the heating element is zero is a second specified temperature difference is exceeded, and between these two apecified temperature difference values, the power on time is inversely proportional to the temperature difference. One embodiment provides that a measuring circuit starts timing when a lower designated temperature is reached and stops when an upper designated temperature is reached, and that only when a specified time span is exceeded, the first program memory is activated, the measured temperature difference is stored during the subsequent predetermined time intervals, and the first program memory transmits a signal relaying the calculated power on time to the heating control, to control the power on time of the heating element.

Preferably, after the boiling temperature has been reached at the end of the heat-up phase, a differential circuit determines the temperature differential between the desired preset cooking temperature and the actual cooking temperature, the temperature difference is measured during a predetermined time interval and at the end of each predetermined time interval, the temperature differential and the measured temperature difference are stored in a second program memory which transmits a signal representing the calculated power on time corresponding to the stored values of temperature differential and temperature difference to maintain the cooking temperature continuously.

To determine the temperature difference during a predetermined time interval according to the present invention, the temperature is scanned periodically during the predetermined time interval and the measured values are transmitted to an intermediate storage means; after the scanning period corresponding to the predetermined time interval has elapsed, the first k and the last k measurements are used to calculate averages, which are used to calculate a difference corresponding to an average difference in temperature, where k is smaller than n/2. In this way, short term temperature fluctuations are eliminated to a large extent.

BRIEF DESCRIPTION OF THE DRAWINGS

The invention will be explained in more detail with reference to the accompanying drawings in which:

FIG. 1 shows several temperature-time curves illustrating different heat-up phases of a steam pressure cooker;

FIG. 3 shows the relationship between power on duration and measured temperature difference, according to a first control program for observed rapid rises in temperature up to the boiling temperature; and FIG. 4 shows the relationship between power on duration, measured temperature difference, and the temperature differential in the cooking temperature after the boiling temperature has been reached, up to the preset cooking temperature.

DESCRIPTION OF THE PREFERRED EMBODIMENTS

Figure 2:
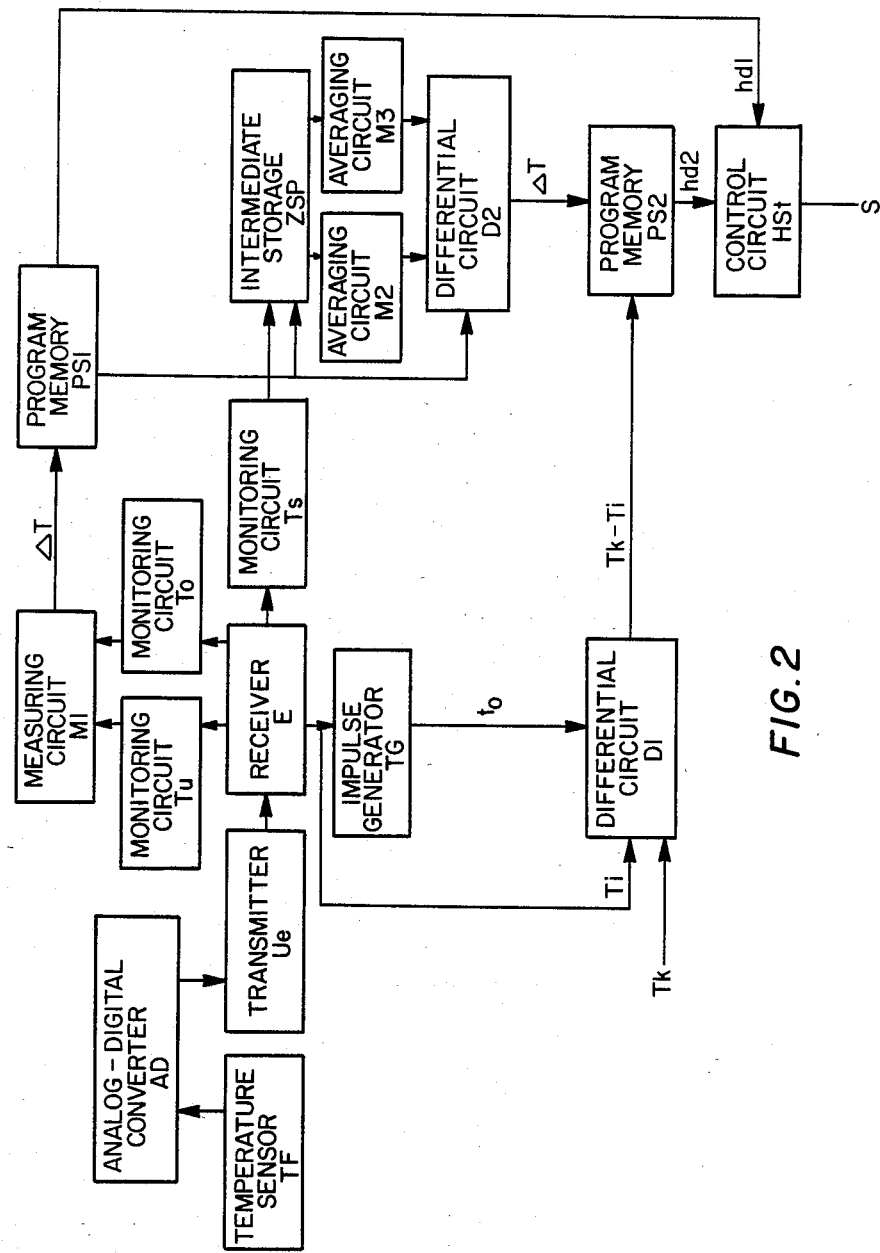
FIG. 2 shows a schematic block diagram of the system to control and regulate the heating applied during the heat-up phase according to this invention.

FIG. 1 shows temperature-time curves $T=f(t)$ during the heat-up phase. Curve $T_1=f(t)$ rises steeply, wheras curve $T_2=f(t)$ rises more slowly. The rate of temperature increase depends on the amount and type of cooking materials in the steam pressure cooker, assuming that maximum heat application has been provided at the beginning of the heat-up phase. If there is only a small amount of liquid in the pressure cooker for generating steam, and above that an amount of solid cooking materials, then the heat-up phase would be represented by curve $T_2=f(t)$. If the elapsed time span $\Delta t$ is measured during the transition from a lower specified temperature Tu of 60° C., for example, to a higher specified temperature To of 85° C., for example, then this elapsed time span may correspond to a minimum value $\Delta t_{min}$ or a maximum value $\Delta t_{max}$. A time span of $\Delta t v$ is specified, which lies between the minimum and maximum values, and equals, for example, about 2 minutes. When specified time span $\Delta t v$ is exceeded in operation by actual elapsed time span $\Delta t$, full heat application is maintained until boiling temperature Ts, at 100° C. is reached. If, however, the elapsed time span $\Delta t$ is less than the specified time span $\Delta t v$, then the heat application must be reduced. If the temperature difference $\Delta T$ during a predetermined time interval is known, the heat applied can be reduced, depending upon the observed temperature difference $\Delta T$, as will be more fully described below. This relationship is defined in a first fixed program so that after determining the temperature difference $\Delta T$ during a predetermined time interval $t_o$.the power on time of the heating element may be calculated for the subsequent predetermined time interval $t_o$. It is advantageous if the control circuit for the heating element is designed as a cyclic control unit, which is known to the art, and in which the duration of the cycle corresponds to the duration of the predetermined time interval to. Depending on the temperature difference $\Delta T$ which is measured, the power on duration can be directly determined, either as a percentage of predetermined time interval $t_o$, or as a period.

Above the boiling temperature Ts, the heat applied is adjusted according to a second program which is independent from the rate of temperature increase which has been determined previously. Again, the temperature difference $\Delta T$ during the predetermined time interval is measured. Simultaneously, the temperature differential between the desired preset cooking temperature $T_k$ and the actual temperature $T_i$ is measured. Depending on the measured temperature difference $\Delta T$ during predetermined time interval $t_o$, and the current temperature differential from the cooking temperature $T_k$, the heat applied is reduced during the following predetermined time interval $t_o$. The second program determines the power on duration of the heating unit as a percentage of the predetermined time interval, or directly as a period of seconds for the varying temperature differences $\Delta T$ and the varying temperature differentials, as described later.

Regulation of the heat-up phase will be described in more detail with reference to the block diagram of FIG. 2. Temperature sensor TF measures the temperature at the steam pressure cooker. The data is converted to a digital signal by analog-digital converter AD and is transmitted to receiver E by transmission component Ue. The temperature measurements received are monitored by circuit Tu to determine whether lower specified temperature Tu of 60° C., for example, has been reached. When temperature Tu is reached, measuring circuit M1 is activated, which determines the time span $\Delta t$ which elapses until circuit To indicates that higher specified temperature To, 85° C., for example, has been reached. Both specified temperatures Tu and To are below boiling temperature Ts, of 100° C. Measuring circuit M1 determines if measured time span $\Delta t$ is of shorter or longer duration than specified time span $\Delta t v$, of 2 minutes, for example. If measured time span $\Delta t$ is longer than $\Delta t v$, a slow temperature increase is taking place, and full heat application may be maintained, until boiling temperature Ts is reached. However, if measured time span $\Delta t$ is shorter than $\Delta t v$, then a rapid increase in temperature is taking place and the heating output will be reduced before boiling temperature Ts is reached. A further change in temperature is determined by measuring the temperature difference $\Delta t$ during predetermined time intervals $t_o$ generated by pulse generatore TG, and transmitting the temperature differences $\Delta T$ to first program memory PS1. First program memory PS1 contains a series of specified values according to FIG. 3, which indicate the power on duration to be calculated for different measured temperature differences $\Delta T$ during predetermined time intervals $t_o$. First program memory PS1 transmits signal hd1 to control circuit HSt, which indicates power on duration S for the following time interval $t_o$ as a percentage of predetermined time interval $t_o$. First program memory PS1 may also calculate in seconds the corresponding power on duration S directly.

As shown in FIG. 3, if the first measured temperature difference falls below a difference of 1.5° C., for example, the heat applied during the following predetermined time interval $t_o$ remains at full capacity heat output levels, whereas above a measured temperature difference of 5° C., for example, the heating element would be turned off during the following predetermined time interval.

After boiling temperature Ts is reached, heat applied is controlled by a second program, illustrated in FIG. 4, regardless of the heat-up phase of the system. After reaching boiling temperature Ts, circuit Ts activates intermediate storage means ZSP, and during each predetermined time interval $t_o$, a number n of data measurements are transmitted in digital form to intermediate storage means ZSP. At the end of each predetermined time interval $t_o$, averages M2 and M3 are calculated by circuits M2 and M3 using the first k and the last k data measurements. Using these averages, circuit D2 calculates the average temperature difference $\Delta T$, thereby eliminating small temperature fluctuations. At the same time, circuit D1 calculates temperature differential $T_k - T_i$. Values for average temperature difference $\Delta T$ and temperature differential $T_k - T_i$ are transmitted to second program memory PS2, which, as shown in FIG. 4, calculates power on duration hd2 for these specific values for the next predetermined time interval, and then transmits the results to heating control circuit HSt. Power on duration hd2, as a percentage of predetermined time interval $t_o$, decreases with smaller temperature differentials $T_k - T_i$, and with larger average temperature differences $\Delta T$.

The relationship shown in FIG. 4 essentially corresponds to the hyperbolic function $y = k/x$.

I claim:

1. An apparatus to control heat output of a heating element heating a pressure cooker with liquid contents during a heat-up phase until a preset cooking temperature is reached, said heating element controlled by a first program means until a boiling temperature of said liquid is reached and by a second program means after said boiling temperature is reached and until said preset cooking temperature is reached, said apparatus comprising:

temperature sensor means (TF) measuring the temperature at said pressure cooker and transmission means (Ue) capable of transmitting a signal corresponding to the measured temperature;

first measuring means (Tu, To, M1) receiving said signal corresponding to said measured temperature and capable of measuring a time span ($\Delta t$) which elapses between reaching a first and second specified temperature (Tu, To), determining whether said elapsed time span ($\Delta t$) is greater than a specified time span ($\Delta tv$), and measuring a temperature difference ($\Delta t$) during specified time intervals ($t_o$) when said elapsed time span ($\Delta t$) is less than said specified time span ($\Delta tv$);

first program means (PS1) capable of analyzing said temperature difference ($\Delta t$) for each said specified time interval ($t_o$) until said boiling temperature (Ts) is reached and transmitting a signal (hd1) to a control circuit (HSt) to control said heating element during each subsequent specified time interval ($t_o$) until said boiling temperature (Ts) is reached;

second measuring means (Ts, ZSP, M2, M3, D2, D1) receiving said signal corresponding to said measured temperature and capable of measuring a temperature difference ($\Delta t$) during said specified time intervals ($t_o$) after said boiling temperature (Ts) is reached and determining a temperature differential ($T_k - T_i$) between said preset cooking temperature ($T_k$) and an actual sensed temperature ($T_i$) during each said specified time interval ($t_o$) after said boiling temperature (Ts) is reached;

second program means (PS2) capable of analyzing said temperature difference ($\Delta t$) and said temperature differential ($T_k - T_i$) for each specified time interval ($t_o$) after said boiling temperature (Ts) is reached and until said preset cooking temperature ($T_k$) is reached and transmitting a signal (hd2) to said control circuit means (HSt) to control said heating element during each subsequent specified time interval ($t_o$) until said preset cooking temperature ($T_k$) is reached; and control circuit means (HSt) maintaining said heating element on continuously until said boiling temperature (Ts) is reched when said elapsed time span ($\Delta t$) is greater than said specified time span ($\Delta tv$) and controlling said heating element when said elapsed time span ($\Delta t$) is less than said specified time span ($\Delta tv$) according to said signal (hd1) until said boiling temperature (Ts) is reached and according to said signal (hd2) after said boiling temperature (Ts) is reached and until said preset cooking temperature ($T_k$) is reached.

2. An apparatus of claim 1 wherein said transmission means (Ue) transmits a signal corresponding to said measured temperature to said first measuring means comprising monitoring circuits (Tu) and (To), and measuring circuit means (M1); said measuring circuit means (M1) activated by said monitoring circuit (Tu) upon said measured temperature reaching said first specified temperature (Tu) and deactivated by said monitoring circuit (To) upon said measured temperature reaching said second specified temperature (To), said measuring circuit means (M1) capable of measuring said elapsed time span ($\Delta t$) between said first and second specified temperatures (Tu, To) which are both less than said boiling temperature (Ts), said measuring circuit means (M1) capable of signaling said control circuit means (HSt) to maintain full heating of said heating element until said boiling temperature (Ts) is reached when said elapsed time span ($\Delta t$) is greater than said specified time span ($\Delta tv$).

3. An apparatus of claim 1 wherein said control circuit means (HSt) is capable of deriving a power-on duration (S) for each subsequent predetermined time interval ($t_o$) from said signals (hd1, hd2) and activating said heating element during said subsequent predetermined time intervals ($t_o$) according to said power-on duration (S), said power-on duration (S) decreasing as said measured temperature difference ($\Delta T$) increases.

4. An apparatus of claim 3 wherein said transmission means (Ue) transmits said signal corresponding to said measured temperature to said second measuring means comprising a monitoring circuit (Ts); an intermediate storage means (ZSP) activated by said monitoring circuit (Ts) upon said measured temperature reaching said boiling temperature (Ts) to store a number (n) of temperature measurements during each said time interval ($t_o$); a first and second averaging circuit means (M2, M3) capable of calculating an average temperature during each said specified time interval ($t_o$) for a first (k) and last (k) number of temperature measurements, the number (k) of temperature measurements being less than n/2; a differential circuit means (D2) capable of calculating said average temperature difference ($\Delta T$) during each said specified time interval ($t_o$); a temperature differential circuit means (D1) capable of computing said temperature differential ($T_k - T_i$) during each said specified time interval ($t_o$).

5. Apparatus according to claim 4, wherein said control circuit (HSt) comprises a semiconductor circuit which is capable of turning said heating element on and off, and which is controlled by a zero voltage switch with cycle control, the duration of said cycle corresponding to the duration of said predetermined time interval ($t_o$).

6. An apparatus of claim 1 additionally comprising a pulse generator (TG) capable of generating said specified time intervals ($t_o$) and transmitting said specified time intervals ($t_o$) to said first measuring means and said second measuring means.

7. In an apparatus to control heat applied during a heat-up phase below a boiling temperature ($T_S$) of liquid contents of a steam pressure cooker heated by a heating element which can be turned on and off by means of a control circuit, the improvement comprising: a temperature sensor means (TF) measuring the temperature at said cooker; transmission means transmitting a signal corresponding to said measured temperature to monitoring circuit means (Tu) and (To); a measuring circuit means (M1) activated by said monitoring circuit (Tu) upon said measured temperature reaching a first specified temperature (Tu) and deactivated by said monitoring circuit (To) upon said measured temperature reaching a second specified temperature (To), said measuring circuit means (M1) measuring an elapsed time span ($\Delta t$) between said two specified temperatures (Tu, To) which are both less than said boiling temperature (Ts), said measuring circuit means (M1) signaling a control circuit means (HSt) to maintain full output of said heating element until said boiling temperature (Ts) is reached when said elapsed time span ($\Delta t$) is greater than a specified time span ($\Delta tv$); a pulse generator means (TG) generating predetermined time interval ($t_o$), said measuring circuit means (M1) measuring a temperature difference ($\Delta T$) during each said predetermined time interval ($t_o$) and transmitting said temperature difference ($\Delta T$) to a first program memory means (PS1) during each said predetermined time interval ($t_o$) when said elapsed time span ($\Delta t$) is less than said specified time span ($\Delta tv$), said first program memory means (PS1) transmitting a signal (hd1) to said control circuit means (HSt), said control circuit means activating said heating element during subsequent predetermined time intervals ($t_o$) for a power-on duration (S) according to said signal (hd1), said power-on duration (S) decreasing as said measured temperature difference ($\Delta T$) increases.

8. Apparatus according to claim 7, wherein said control circuit means (HSt) comprises a semiconductor circuit which is capable of turning said heating element on and off, and which is controlled by a zero voltage switch with cycle control, the duration of said cycle corresponding to the duration of said predetermined time interval ($t_o$).

9. In an apparatus to control heat applied during a heat-up phase above a boiling temperature (Ts) of liquid contents of a steam pressure cooker heated by a heating element which can be turned on and off by means of a control circuit means, the improvement comprising: a temperature sensor means (TF) measuring said temperature at said pressure cooker after said boiling temperature (Ts) has been reached; a pulse generatore means (TG) generating predetermined time intervals ($t_o$); a monitoring circuit means (Ts) activating a storage means (ZSP) when said boiling temperature (Ts) has been reached, said storage means (ZSP) storing a number (n) of temperature measurements for each said time interval ($t_o$); averaging circuit means (M2) and (M3) and differential circuit means (D2) calculating an average temperature difference ($\Delta T$) from a first (k) and last (k) temperature measurements, said number (k) of measurements used being less than n/2; a temperature differential circuit means (D1) computing a temperature differential ($T_k - T_i$) between a preset cooking temperature ($T_k$) and an actual measured temperature ($T_i$); a second program memory (PS2) providing a signal (hd2) according to said average temperature difference ($\Delta T$) and said temperature differential ($T_k - T_i$) to said control circuit means (HSt) to activate said heating element during subsequent predetermined time intervals ($t_o$) for a power-on duration (S) which decreases as said temperature difference ($\Delta T$) increases, and as said temperature differential ($T_k - T_i$) decreases.

10. Apparatus according to claim 9, wherein said control circuit (HSt) comprises a semiconductor circuit which is capable of turning said heating element on and off, and which is controlled by a zero voltage switch with cycle control, the duration of said cycle corresponding to the duration of said predetermined time interval ($t_o$).

11. A process to control and regulate heat output of a heating element heating a pressure cooker with liquid contents during a heat-up phase until a preset cooking temperature is reached comprising: measuring the temperature at said pressure cooker and transmitting a signal corresponding to the measured temperature during said heat-up phase; measuring an elapsed time span ($\Delta t$) between reaching a first and second specified temperature (Tu, To) which are both less than a boiling temperature (Ts); maintaining said heating element turned on continuously until said boiling temperature (Ts) is reached when said elapsed time span ($\Delta t$) exceeds a specified time span ($\Delta tv$); measuring a temperature difference ($\Delta T$) during specified time intervals ($t_o$) when said elapsed time span ($\Delta t$) is less than said specified time span ($\Delta tv$); maintaining said heating element on during subsequent predetermined time intervals ($t_o$) before said boiling temperature (Ts) is reached for a power-on duration (S), determined according to a first program, said power-on duration (S) decreasing as said temperature difference ($\Delta T$) measured during said predetermined time intervals ($t_o$) increases; continuing to measure said temperature difference ($\Delta t$) during subsequent predetermined time intervals ($t_o$) after said boiling temperature (Ts) is reached, and additionally measuring a temperature differential ($T_k - T_i$) between said preset cooking temperature ($T_k$) and an actual sensed temperature ($T_i$) during each said time interval ($t_o$) after said boiling temperature ($T_s$) is reached; maintaining said heating element on during subsequent predetermined time intervals ($t_o$) for a power-on duration (S) determined according to a second program, said power-on duration (S) decreasing as said measured temperature difference ($\Delta T$) increases, and as said temperature differential ($T_k - T_i$) decreases.

12. A process of claim 11, additionally comprising: measuring said temperature at said pressure cooker by a temperature sensor means (TF): transmitting a signal corresponding to said measured temperature to monitoring circuit means (Tu) and (To), said monitoring circuit means (Tu) activating a measuring circuit means (M1) when said measured temperature reaches said first specified temperature (Tu) and said monitoring circuit means (To) deactivating said measuring circuit means (M1) when said measured temperature reaches said second specified temperature (To); said measuring circuit means (M1) deriving and transmitting a signal to said control circuit means (HSt) to maintain said heating element on continuously until said boiling temperature (Ts) is reached when said elapsed time span ($\Delta t$) is greater than said specified time span ($\Delta tv$).

13. A process of claim 11, additionally comprising: generating said predetermined time intervals ($t_o$) by means of a pulse generator means (TG), transmitting said temperature differences ($\Delta T$) to a first program memory (PS1), said first program means (PS1) transmitting a signal (hd1) to said control circuit means (HSt), said control circuit means activating said heating element during subsequent predetermined time intervals ($t_o$) for a power-on duration (S) which decreases as said measured temperature difference ($\Delta T$) increases.

14. A process of claim 13, additionally comprising: controlling said heating element after said boiling temperature (Ts) is reached by monitoring circuit means (Ts) activating storage means (ZSP) when said boiling temperature (Ts) is reached; transmitting a number (n) of temperature measurements for each said time interval ($t_o$) to said storage means (ZSP); calculating an average temperature difference ($\Delta T$) for each predetermined time interval ($t_o$) by averaging circuit means (M2) and (M3) and differential circuit means (D2) using a first (k) and last (k) temperature measurements, said number (k) of temperature measurements used being less than n/2; computing said temperature differential ($T_k - T_1$) between said preset cooking temperature ($T_k$) and said actual measured temperature ($T_i$) by a differential circuit means (D1), transmitting said temperature difference ($\Delta T$) and said temperature differential ($T_k - T_i$) to said second program memory (PS2), said second program memory deriving a signal (hd2) according to said temperature difference ($\Delta T$) and said temperature differential ($T_k - T_i$) and transmitting said signal (hd2) to said control circuit means (HSt); said control circuit means (HSt) deriving power-on duration (S) and activating said heating element during each subsequent time interval ($t_o$) for said power-on duration (S).

15. A process of claim 14, comprising: turning said heating element on and off by a control circuit (HSt) comprising a semiconductor circuit controlled by a zero voltage switch with cycle control, the duration of each cycle corresponding to the duration of said predetermined time interval ($t_o$).

* * * * *